Jan. 10, 1956  A. C. WICKMAN  2,730,218
HYDRAULIC CLUTCH
Filed Sept. 28, 1954  3 Sheets-Sheet 1

INVENTOR.
Axel. C. Wickman.
BY
Stanley Lightfoot
Attorney

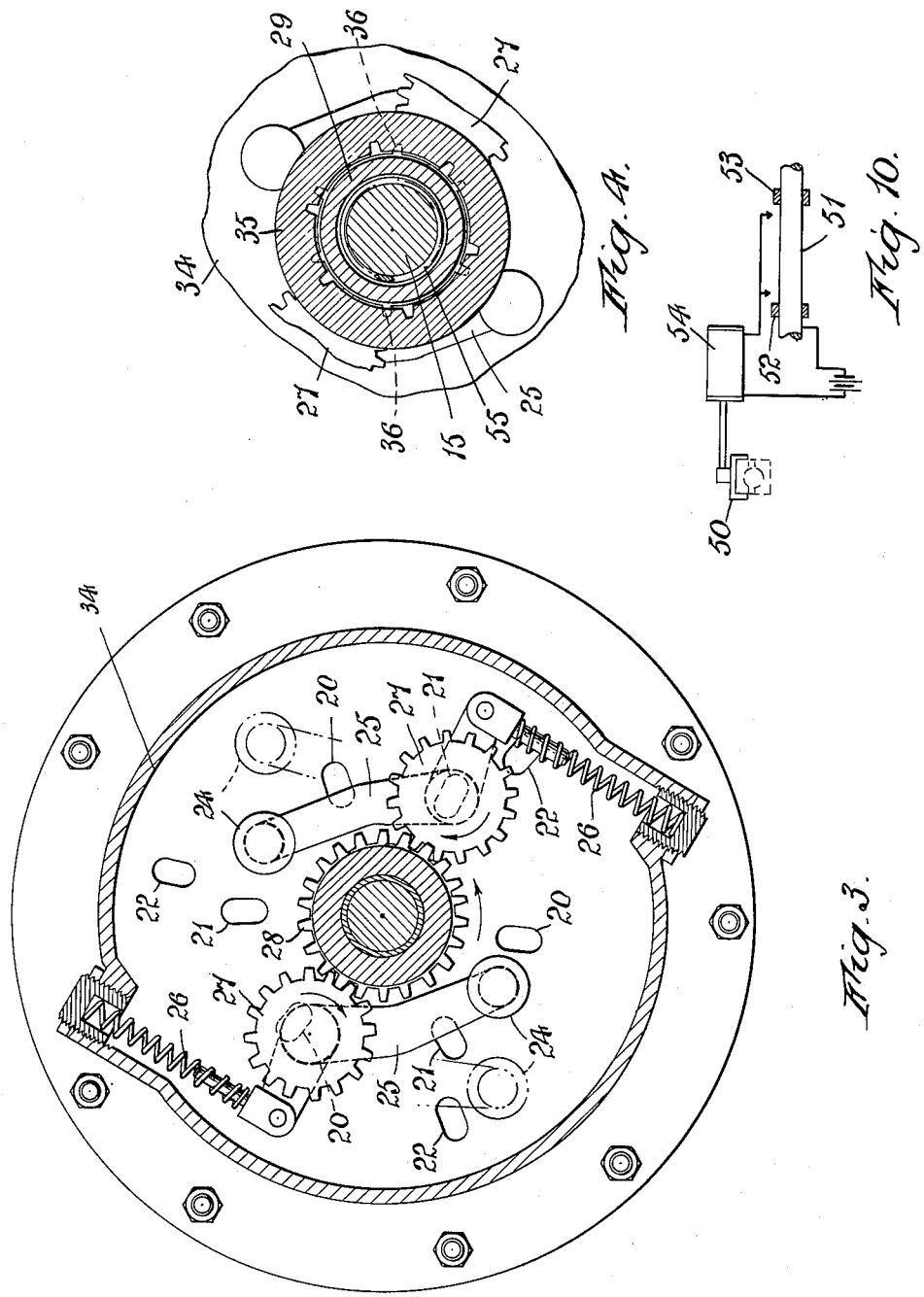

Jan. 10, 1956     A. C. WICKMAN     2,730,218
HYDRAULIC CLUTCH

Filed Sept. 28, 1954     3 Sheets-Sheet 3

INVENTOR.
Axel C. Wickman.
BY
Stanley Lightfoot
Attorney

United States Patent Office

2,730,218
Patented Jan. 10, 1956

2,730,218

HYDRAULIC CLUTCH

Axel C. Wickman, Oak Park, Detroit, Mich.

Application September 28, 1954, Serial No. 458,746

14 Claims. (Cl. 192—61)

This invention relates to hydraulic clutches, such as for use in automotive vehicles, and more particularly to such clutches involving, as the power transmission means, hydraulic pumps (such as gear pumps) the flow of fluid through which is valve-controlled in such manner that the rotation of a take-off shaft, relative to a power input shaft, is determined by the valve-controlled flow of fluid through the said pumps.

The invention contemplates, in such a clutch, an arrangement of ports and a rotary valve plate wherein the gear pumps will become hydraulically locked, in both directions of pump rotation, whenever the clutch is rotated above idling speed; so that a solid driving action in the clutch will result under conditions where this is desirable for driving a vehicle, to permit starting of an engine by "towing" and to prevent overrunning of the engine by the power output shaft.

The invention further contemplates the provision of means for eliminating drag in the clutch, such as during gear changing; and also the provision of means whereby the clutch may be applied in a practical manner to, or in combination with, automatic gear changing mechanisms, synchromesh gear boxes, epicyclic gears, and similar transmissions requiring drag-eliminating features in the clutch.

In carrying the invention into effect as incorporated in a hydraulic clutch of the gear pump type, for example, I propose to provide a valve mechanism so arranged that, when the engine is idling, the inlet ports to the pump gears are closed and the exhaust ports therefrom fully opened; and a centrifugal governor arranged to rotate a valve plate in a manner whereby the inlets to the pumps are open and the exhaust gradually closed until, finally, the inlets are fully opened and exhaust fully closed, which is the "locked" or driving position of the clutch.

As referred to hereinbefore, it is desirable that an operator should be able to disengage the clutch momentarily to permit of gear changing. Therefore, means are provided for the further rotation of the valve plate, beyond the "clutch locking" position, in a manner whereby such further rotation closes the inlet ports and opens the exhaust ports of the pumps to relieve the drive on the clutch; provision being made to thereafter move the valve plate back to the clutch-locking position upon the shifting of gears being effected.

To permit this clutch-relieving operation of the valve plate, in coincidence with the shifting of gears, the gear lever may have a small amount of lost motion so that the initial movement of the gear lever may close an electrical circuit through a solenoid (or operate a vacuum cylinder, for instance) which in turn will effect the said additional rotation of the valve plate and so relieve the drive on the clutch to allow the shifting of gears before the valve plate is moved back, by means provided, to its clutch-locking position.

Other objects and advantages will become apparent as the said invention is hereinafter further disclosed, all of which is more particularly described hereinafter, by way of example, having reference to the accompanying drawings, wherein:

Figure 3 is a transverse section of the same taken on a plane indicated by the line 3—3 in Figure 1 with the centrifugal governing mechanism shown in elevation;

Figure 4 is a detail transverse sectional view taken on a plane indicated by the line 4—4 in Figure 1;

Figure 5:
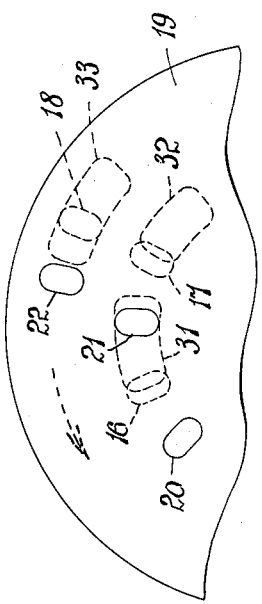

Figure 5 is a diagram illustrating the position of the rotary valve plate in relation to the valve ports at slow speed rotation of the clutch, say, up to 700 R. P. M.;

Figures 6, 7, 8, and 9 are similar diagrams showing the valve plate position at different speeds of clutch rotation; and Figure 10 is a schematic diagram showing solenoid operation of the valve plate rotating sleeve of the clutch from a gear shifting element.

In the simple assembly shown, a pump body is indicated as comprising a pair of circular plates 10 and 11 between which a pump casing 12 is bolted, and this body houses three planetary gears 13 arranged in circular series about and in mesh with a sun gear 14 which is mounted on the end of the clutch output shaft 15; the gears described operating as three gear pumps.

Figure 2:
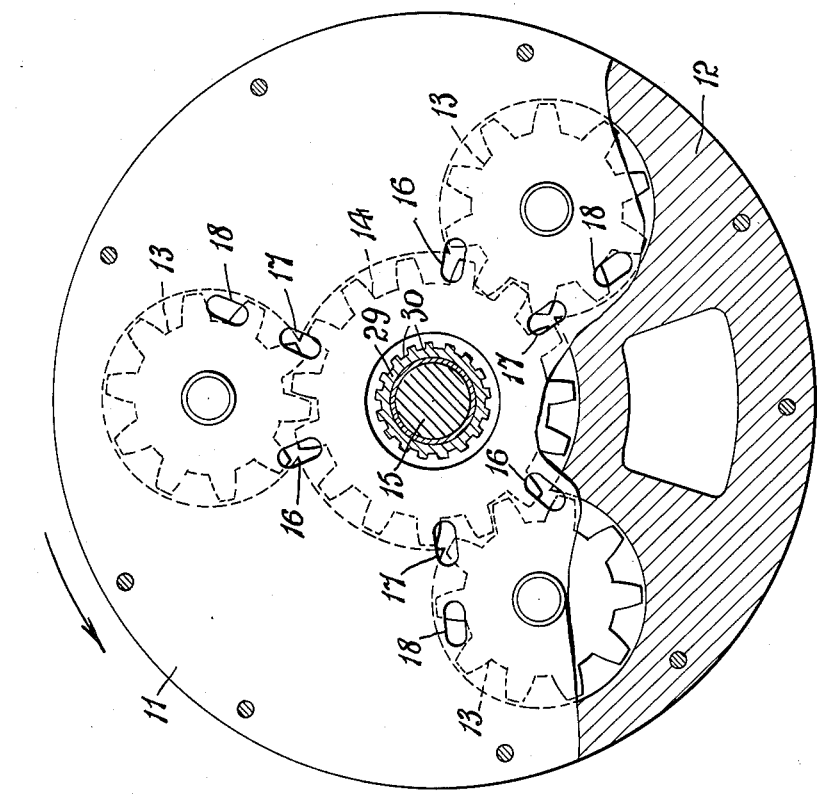
Figure 2 is a transverse sectional view of the same taken on planes indicated by the line 2—2 in Figure 1.

The said plate 11 is provided with exhaust ports 16 and 17 and an inlet port 18 for each of said pumps, these ports 16, 17 and 18 being indicated in full lines in Figure 2 and in dotted lines in Figures 5 to 9 of the drawings.

The clutch as a whole is, in the illustrated arrangement, rotated in a counter-clockwise direction as indicated by the arrow in Figure 2 by any suitable source of power (not shown).

Secured in spaced relation to the pump plate 11 is a fixed cover plate 19 similarly provided with exhaust ports 20 and 21 and inlet ports 22 for each of the gear pumps (and indicated in full lines) corresponding to the exhaust ports 16 and 17 and the inlet ports 18 of the said pump plate, but angularly off-set therefrom in a counter-clockwise direction as viewed in the drawings to the approximate extent indicated in Figure 5.

Between the pump plate 11 and the cover plate 19 is a valve plate 23 which is capable of relative rotation therebetween by the centrifugal action of weights 24 carried by arms 25, and acting against suitably adjusted springs 26. The action of these weights controls the rotary adjustment of the valve plate 23 through gearing 27 and 28, the latter gear 28 being formed on a sleeve 29 with which it has left-hand splined engagement at 30 with the hub of the valve plate 23.

The said valve plate 23 is provided with arcuately elongated inlet slots 33 therethrough which are radially disposed in conformance with the position of the inlet ports of the pump plate 11 and the inlet ports of the cover plate 19; and the said valve plate 23 is also provided with similarly elongated exhaust ports 31 and 32 radially disposed to open or close the exhaust ports, of the pump plate 11 and the cover plate 19, according to the rotary positioning of the said valve plate 23 by the action of the centrifugal operating means referred to.

Forming part of the general clutch casing is a housing 34 enclosing the centrifugal mechanism, and this housing carries an internally notched ring 35 (referred to hereinafter as the "blocker" ring), the hub of the splined sleeve 29 extending axially through this blocker ring and being provided with teeth 36 adapted to be rotated into or out of meshing alignment with the spacing of the notches of the blocker ring 35 according to circumstance.

Figure 1:
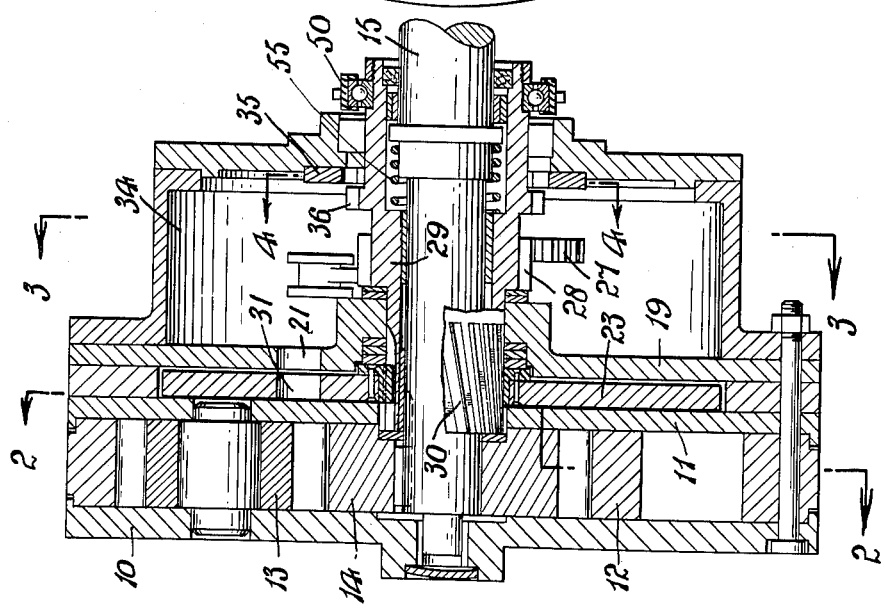
Figure 1 is a vertical longitudinal section of a clutch embodying the said invention.

The outer end of the hub extension of the said sleeve 29 is grooved or otherwise adapted to admit of the connection thereto of manual or other shifting mechanism whereby the said sleeve 29 may be longitudinally moved for the purposes which will be explained. Part of such a mechanism is shown as the collar 50 in Figures 1 and 10.

In the arrangement as illustrated, it is intended that the housing 34 be charged with a suitable oil or liquid to about, say, 70 per cent of its capacity whereby, upon rotation to sufficient speed to distribute the oil centrifugally within the said housing, the inner circular level of the oil would extend between the inlet ports 22 and the outlet ports 20 and 21 of the cover plate 19. Under such circumstances the exhaust ports would communicate with the resulting central air space within the said housing, whilst the inlet ports would be submerged.

By suitably proportioning the weights 27 and springs 26 to operate at desirable rotational speeds of the clutch, the arrangement of ports in the pump and cover plates 11 and 19, and of the slots in the valve plate 23, will cooperate to produce the following conditions at various rotational speeds of the clutch as a whole.

Figure 5 shows the position of the movable valve plate 23 during idling speeds of the clutch, say, up to 700 R. P. M., when the initial resistance of the springs 26 is sufficient to prevent outward movement of the weights 24; and it will be noted that, in this idling position of the said valve plate 23, the inlet ports 18 of the pump plate 11 are completely closed while at the same time the exhaust ports 16 of the said pump plate 11 are half opened (through the slots 31 of the valve plate 23 to the exhaust ports 21 of the cover plate 19) the other exhaust ports 17, however, remaining closed.

Consequently, under these idling conditions, no oil may pass through the said inlet ports 22 to the gear pumps, and, as the exhaust ports 16 from the said gear pumps are open to the air within the central portion of the housing 34, the gears 13 may rotate freely as is desirable.

Figure 6:
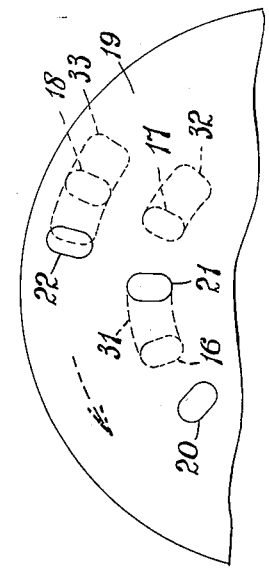
Figure 9:
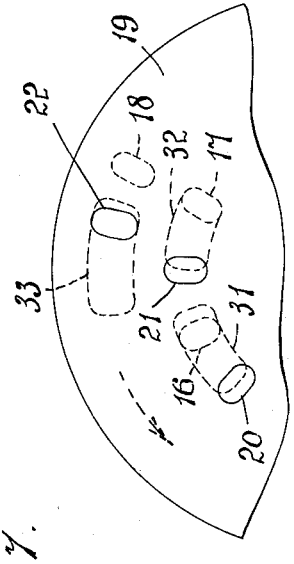

Upon increasing the rotation of the clutch beyond the idling speed to, say, about 800 R. P. M., the weights 24 may move the arms 25 outwardly against the resistance of the said springs 26, whereupon the gears 27 will rotate the gear 28 to effect (through the medium of the sleeve 29) partial rotation of the valve plate 23 to a degree, as shown in Figure 6, wherein the inlet ports 22 to the gear pumps are half opened and the exhaust ports 16 are fully open. Thus oil may now be pumped by the three gear pumps, and the work done in so pumping the oil will result in a reaction on the sun gear 14 with a tendency to drag it around with the clutch body. This reaction is, of course, transmitted to the output shaft 15.

Figure 7:
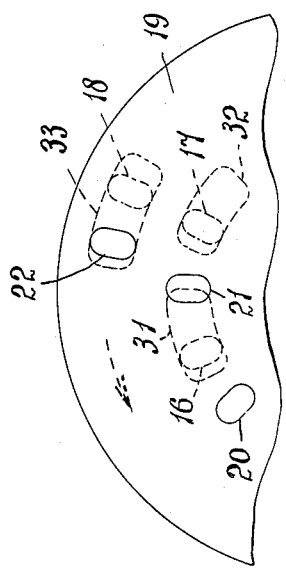

Referring now to Figure 7; it will be seen that further increase in speed imparted by the source of power to the clutch, say, to 900 R. P. M., will result in the action of the weighted arms 25 further rotating the valve plate 23 relative to the plates 11 and 19 until the inlet valve 18 is fully opened to the flow of oil therethrough, the exhaust ports 16 now half closed (the exhaust ports 17 remaining closed) so that considerably more work is then produced by the gear pumps with consequently greater reaction transmitted to the sun gear 14 and to the output shaft 15.

Figure 8:
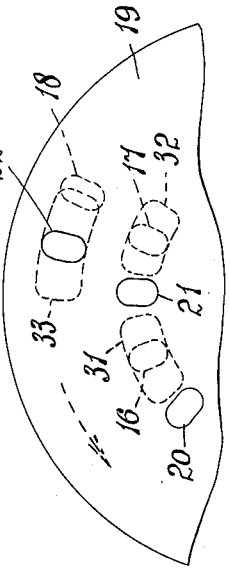

Referring to Figure 8; it will not be seen that at a still higher clutch speed, such as 1000 R. P. M., the effect of the centrifugal control described is to so further rotate the valve plate 23 as to half close the inlet ports 18 and at the same time completely close the exhaust ports 16 and 17 with the result that the gear pumps are then locked hydraulically and, except for a small creep due to leakage between the valve plate 23 and the valve plates 11 and 19 (which is desirable), the entire engine torque is now transmitted through the sun gear 14 to the output shaft 15 of the clutch.

The valve plate 23 is capable of still further rotation relative to the plates 11 and 19 to meet certain conditions of operation, which will be later referred to; but first of all reference to operation under conditions of the four plate positions, already described, will be now outlined.

It should be kept in mind that, since the slots 31 and 32 in the valve plate 23 are always open to the exhaust ports 16 and 17 of the pumps and that the actual valve cut-off is arranged between these slots and the openings 20 and 21 in the cover plate 19, the said valve plate 23 is always hydraulically balanced and, therefore, readily movable under the influence of relatively small forces exerted by the centrifugal mechanism on the gear 28.

Assuming the clutch to be used in a car and subject to conditions normal to car operation, it will be observed that, should the car be brought to a standstill with the clutch speed falling below 1000 R. P. M., the control springs 26 of the clutch, overcoming the reduced centrifugal effect of the weights 24, will effect rotation of the said gears 27 and consequently the gear 28 in a reverse direction to that already described. In such a case, the valve plate 23 will be rotated backwards relative to the pump plate 11 and reversely through the successive stages previously described until, at 700 R. P. M., the said valve plate 23 will again be in the idling position illustrated in Figure 2.

Should the car tend to overrun the engine (and consequently the clutch) the pump gears 13 will tend to change their relative rotation but will be unable to do this since oil entering the inlet ports 18 would become locked by the closed exhaust ports 17. The clutch, therefore, at speeds above the described locking position is practically solid in both directions of rotation except for such slight creep as that previously referred to as a result of leakage between the opposed surfaces of the valve plate 23 the pump and cover plates 11 and 19.

Where the clutch is used in combination with change speed gear mechanism, such as is usual in the automotive vehicle practice, provision must be made to minimize drag in the clutch such as would interfere with gear changing at speeds above the locked position described, and this I accomplish by means of the gear sleeve 29 having the left-hand splined engagement with the valve-plate-carrying sleeve 30.

It will be seen that, by moving the said sleeve 39 in a direction away from the said valve plate 23, additional movement may be imparted to the said valve plate 23 beyond that shown in Figure 8 as a result of the plate-rotating action of the spline 30 on the said shaft 15. For instance, if at above 1000 R. P. M., the sleeve 29 is so moved axially, the valve plate 23 may be rotated to the position indicated in Figure 9 wherein the inlet ports 18 are closed and the exhaust ports 16 and 17 are half open. Under these conditions (the said exhaust ports 16 and 17 being open to the air space in the central portion of the housing 34 due to centrifugal distribution of the oil in peripheral portion of the said housing) no liquid can be pumped in either direction by the gear pump, so that the synchromesh cones of a standard automobile gearbox could readily accelerate or decelerate the gear 13 and the gear 14 to allow the gear shifting operation to be freely effected.

As already stated, the outer end of the sleeve 29 is adapted for the application thereto of manual or other means for effecting its sliding motion. For instance, as shown in Figure 10, it lends itself readily to operation by any suitable electrical mechanism, which may be provided with a lost motion on the gear shifting member 51 of the vehicle in which the clutch is incorporated, whereby the initial movement of the said member 51 will effect (through the medium of either of the contacts 52 and 53, the solenoid 54 and the reciprocal collar 50), the sliding of the said sleeve 29; so that immediately the gear has been shifted, release of the gear lever or member 51 will again permit a spring 55 to move the sleeve 29 back into the original position illustrated in Figure 1 thereby relocking the clutch.

When the vehicle is stationary and a gear has to be engaged while the clutch is idling, the lost motion electric switch above referred to could, when closed, tend to move the sleeve 29 and put the gear into operation. This, of course, would be undesirable and, to obviate such a possibility, I have provided the stop or blocker ring 35 which is opposed to teeth 36 formed on the sleeve 29, as described, and arranged so that, when the valve plate 23 is in the idling position shown in Figure 5, the notches of the ring 35 will be offset from the teeth 36 of the sleeve 29 preventing axial movement of the said sleeve 29 under those conditions.

However, when the clutch is in driving condition above 1000 R. P. M., the final movement of the valve plate 23 under the influence of the spline 30 to the extent already described will be accompanied by a corresponding rotation of the teeth 36 with the relation to the notches of the blocker ring 35, whereby they will then be in meshing relationship instead of offset therefrom and axial movement of the said sleeve 29 to further advance the valve plate 23 to the position shown in Figure 9 may then be accomplished.

The described clutch also permits of the starting of a vehicle by the well-known "towing" method inasmuch as if the engine is stationary and the vehicle is pushed, the oil in the stationary clutch is no longer centrifugally distributed within the housing 34 but simply lies in the lower part of the said housing until pushing of the vehicle rotates the output shaft 15 and effects rotation of the pump gear 13. Since the exhaust ports 16 are half open under these conditions (see Figure 2) and the lowermost gears are submerged, they will pick up oil, and, as the exhaust ports 17 are closed, the mechanism will hydraulically lock and effectively drive the engine for a tow start. Immediately the engine starts, of course, the described idling conditions from 0 to 700 R. P. M. will take over.

Neither the valve plate 23 nor the gear pumps 13 need necessarily be produced to close tolerances since a slight creep in this type of clutch is desirable and such a creep factor will depend upon the torque transmitted. When this constant creep factor is related as a percentage of slip to engine R. P. M., it gives a higher percentage of slip at low rates of revolution with high torque, and a much lower percentage of slip at higher rates of revolution and lower torque; all of which will be recognized as of advantage in a hydraulic clutch intend for use in motor driven vehicles and for similar purposes.

While the clutch described may have many industrial uses, it lends itself excellently for such applications as in front of a synchromesh gearbox or coupled with an epicyclic gear; wherein these combinations could readily provide a manual shift, semiautomatic shift, or fully automatic shift transmission such as would require no clutch pedal in the cockpit of the car.

While I have described the mechanism as including the slidable sleeve 29 (for cases where the clutch may have to be released at rates of revolution above the locked position indicated by the valve setting in Figure 8), this sliding sleeve mechanism may be eliminated where the results of its operation are not called for.

Furthermore, automatic control of the valve plate 23, such as is effected by the centrifugal governing mechanism described, or its equivalent, may be eliminated in cases where manual or electric operation of the said valve plate 23 may be sufficient for the purposes.

Although herein the clutch body or casing is considered as the power input member it will be obvious that, where conditions admit, the shaft 15 may be the power input member and the clutch body the power output member (as is the case when a car is started by "towing," for instance) and such an arrangement is particularly feasible where automatic centrifugally operated valve control mechanism may not be required.

What I claim is:

1. In a hydraulic clutch, a rotatable casing, a pair of spaced partitions within said casing to provide a hydraulic pump chamber and a liquid reservoir chamber, first inlet and exhaust ports in one of said partitions, and second inlet and exhaust ports in said other partition a predetermined angular distance from said first ports, a rotatable disk valve positioned between said partitions, said disk valve being provided with enlarged openings wherein said first and second ports may be selectively communicated with one another as said valve is rotated.

2. In a hydraulic clutch as defined in claim 1, including means to rotate said disk valve predetermined distances in response to the speed of rotation of said casing to throttle the flow of liquid through said ports.

3. In a hydraulic clutch, a rotatable casing, a pair of spaced partitions located within said casing to set off a hydraulic pump chamber and a centrifugal liquid reservoir chamber, first inlet and outlet ports in one of said partitions and second inlet and outlet ports in the other partition and offset a predetermined angular distance from said first ports, a rotatable disk valve positioned between said partitions and provided with an opening through which said first and second inlet ports may be communicated and an additional opening through which said first and second outlet ports may be communicated, means to rotate said disk valve predetermined distances to restrict the flow of liquid through said ports.

4. In a hydraulic clutch as defined in claim 3, including a hydraulic pump means located in said pump chamber and rotatable responsive to the flow of liquid through said ports, and through said hydraulic pump chamber.

5. In a hydraulic clutch as defined in claim 4, said disk valve rotating means being responsive to the speed of rotation of said casing whereby the flow of liquid through said ports is controlled in accordance with said speed of rotation.

6. In a hydraulic clutch, a rotatable casing, a pair of spaced partitions located within said casing to set off a hydraulic pump chamber and a centrifugal liquid reservoir chamber, first inlet and exhaust ports in one partition and second inlet and exhaust ports in the other partition, a rotatable disk valve positioned between said partitions and provided with passageways through which said first and second inlet and outlet ports may be respectively communicated and means to rotate said disk valve to regulate the flow of liquid through said ports in response to the speed of rotation of said casing.

7. In a hydraulic clutch as defined in claim 6, said valve rotating means comprising a sleeve having an elongated helically splined portion extending through a central opening in said disk valve and in engagement with teeth formed upon said disk valve within said opening, whereby rotation of said sleeve rotates said disk valve and axial movement of said gear sleeve likewise rotates said disk valve.

8. In a hydraulic clutch as defined in claim 7, and including means connected with said sleeve to rotate said sleeve in response to varying casing speeds.

9. In a hydraulic clutch, a rotatable hollow casing, a pair of spaced partitions located within said casing to set off a hydraulic pump chamber and a centrifugal liquid reservoir chamber, first inlet and outlet ports in one of said partitions and second inlet and outlet ports in said second partition and radially offset a predetermined angular distance from said first ports, said inlet ports being located near the outer peripheries of said partitions and said outlet ports being located remote from said outer peripheries; a rotatable disk valve positioned between said partitions and provided with an opening through which said first and second inlet ports may be comunicated, and means to rotate said disk valve predetermined distances to restrict the flow of liquid through said ports.

10. In a hydraulic clutch, as defined in claim 9 above, said disk valve rotating means being responsive to the speed of rotation of said casing whereby the flow of liquid through said ports is controlled in accordance with said speed of rotation of said casing.

11. In a hydraulic clutch, as defined in claim 9 above, said disk valve rotating means including a slidable sleeve having a helically toothed spline formed thereon, said spline being interconnected with teeth formed on said disk valve whereby sliding of said sleeve causes said disk valve to rotate.

12. In a hydraulic clutch, a rotatable hollow casing, a pair of spaced partitions located within said casing to set off a hydraulic pump chamber and a centrifugal liquid reservoir chamber, first inlet and outlet ports in one of said partitions, and second inlet and outlet ports in said second partition and radially offset a predetermined angular distance relative to said first ports, said inlet ports being located near the outer peripheries of said partitions and said outlet ports being located remotely from said outer peripheries; a rotatable disk valve positioned between said partitions and provided with an opening through which said first and second inlet ports may be communicated and an additional opening through which said first and second outlet ports may be communicated; aligned central openings through said partitions, disk plate, and casing, a power shaft inserted through said openings and extending into said pump chamber, pump means in said chamber to rotate said shaft with said casing at varying speeds dependent upon the opening of said ports; a sleeve fitted over said shaft and having a helical toothed splined portion cooperating with teeth upon said disk valve, means responsive to the speed of rotation of said casing rotating said shaft and thereby said disk valve, said sleeve being axially slidable to cause said helical portion to rotate said disk valve, and means preventing said sleeve from sliding below a predetermined casing rotational speed.

13. In a hydraulic clutch, a rotatable hollow casing, a pair of spaced partitions within said casing setting off a hydraulic pump chamber and a centrifugal liquid reservoir chamber, first inlet and outlet ports in one of said partitions and second inlet and outlet ports in said second partition, a rotatable disk valve positioned between said partitions and provided with an opening through which said first and second inlet ports may be communicated and an additional opening through which said first and second outlet ports may be communicated; a rotatable and slidable splined member having teeth at an angle relative to the axis of said member, said teeth being interconnected with teeth on said disk valve, and means locking said splined member from sliding below a predetermined casing speed.

14. In a hydraulic clutch as defined in claim 13 above, and including means to rotate said splined member in response to the speed of rotation of said casing.

References Cited in the file of this patent
UNITED STATES PATENTS

| | | |
|---|---|---|
| 858,109 | Schwarz | June 25, 1907 |
| 873,621 | Schwarz | Dec. 10, 1907 |
| 1,829,554 | Baker | Oct. 27, 1931 |
| 2,551,249 | Dickens | May 1, 1951 |